US012264521B2

(12) United States Patent
Rochefort

(10) Patent No.: US 12,264,521 B2
(45) Date of Patent: Apr. 1, 2025

(54) DOOR HANGER SYSTEM AND METHOD

(71) Applicant: Transportation IP Holdings, LLC, Norwalk, CT (US)

(72) Inventor: Eric Rochefort, Saint-Laurent (CA)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 17/892,374

(22) Filed: Aug. 22, 2022

(65) Prior Publication Data

US 2023/0127179 A1 Apr. 27, 2023

Related U.S. Application Data

(60) Provisional application No. 63/271,788, filed on Oct. 26, 2021.

(51) Int. Cl.
*E05D 15/06* (2006.01)

(52) U.S. Cl.
CPC ...... *E05D 15/0643* (2013.01); *E05Y 2201/10* (2013.01); *E05Y 2201/628* (2013.01); *E05Y 2201/708* (2013.01); *E05Y 2900/531* (2013.01)

(58) Field of Classification Search
CPC ............ E05Y 2201/628; E05D 15/0643–0647
See application file for complete search history.

(56) References Cited

U.S. PATENT DOCUMENTS 1,106,992 A * 8/1914 Thomas .............. E05D 15/0643 16/88
1,259,261 A * 3/1918 Mears ................. E05D 15/0652 16/88
1,731,801 A * 10/1929 Tracy .................. E05D 15/0643 49/412
2,963,753 A * 12/1960 Seaburg ............... B61D 19/005 403/387
3,089,203 A * 5/1963 Roselius ................. E05D 15/06 49/409
3,143,758 A * 8/1964 Drunham ............ E05D 15/0643 16/88
3,466,698 A * 9/1969 Nystrom ............. E05D 15/0643 16/87 R
3,740,898 A * 6/1973 McKenzie .......... E05D 15/0643 49/410

(Continued)

FOREIGN PATENT DOCUMENTS

CN 116181172 A * 5/2023 ............. E05D 13/00

*Primary Examiner* — Daniel P Cahn
*Assistant Examiner* — Patrick B. Ponciano
(74) *Attorney, Agent, or Firm* — K&L Gates LLP

(57) ABSTRACT

A door hanger system includes a housing and a bearing assembly that includes a cage and plural bearings within the cage. A slider is coupled with the bearing assembly and includes a bearing interface portion disposed within the bearing assembly and a door interface portion that is coupled with a door panel. The slider and the bearing assembly move in a first direction to move the door panel toward a closed position, or in a second direction to move the door panel toward an open position. A reset device is disposed within the bearing assembly and positioned between an end of the housing and the slider. The reset device interferes with the cage to move the cage toward the first end of the housing responsive to the slider moving in the second direction interfering with the reset device.

18 Claims, 7 Drawing Sheets

(56) References Cited

U.S. PATENT DOCUMENTS

| | | | | |
|---|---|---|---|---|
| 4,854,078 | A * | 8/1989 | DePrima | E05D 15/0643<br>16/87 R |
| 6,055,777 | A * | 5/2000 | Rekioja | E05F 15/56<br>49/360 |
| 11,447,997 | B2 * | 9/2022 | Bortoluzzi | E05D 15/063 |
| 2007/0186481 | A1 * | 8/2007 | Tomita | E05F 1/16<br>49/409 |
| 2009/0090587 | A1 * | 4/2009 | Tomita | F16F 9/3228<br>188/282.6 |
| 2020/0040631 | A1 * | 2/2020 | Sisto | E05D 15/0643 |
| 2024/0295141 | A1 * | 9/2024 | Chen | E05F 15/60 |

* cited by examiner

DOOR HANGER SYSTEM AND METHOD

CROSS-REFERENCE TO RELATED APPLICATIONS

The application claims priority to U.S. Provisional Application No. 63/271,788 (filed 26 Oct. 2021), the entire disclosure of which is incorporated herein by reference.

BACKGROUND

Technical Field

The subject matter described herein relates to a door hanger system and related method.

Discussion of Art

Suspension door hangers may be used in various environments such as onboard vehicle systems, at vehicle platforms, to allow or prohibit access to a building or structure, or the like. The suspension door hangers may include door panels that are coupled with sliders that may control the movement of the door panels along a longitudinal direction.

The door hanger may be one of a bi-parting door hanger system in which two door panels are moved towards each other (e.g., to the closed positions) or moved away from each other (e.g., to the open positions). For example, FIG. 1 illustrates one example of a bi-parting door hanger system 10. The system may include a first door hanger 12A and a second door hanger 12B. The first door hanger includes a first housing 14A that extends between a first end 20 and a second end 22, and the second door hanger system includes a second housing 14B that extends between a first end 30 and a second end 32. Door panels 40 are coupled with the first and second housings, respectively, and are moved in a longitudinal direction 21 between fully closed positions and one or more open positions. For example, in the illustrated embodiment, the door panels may be in the fully closed position responsive to the door panels interfering with or abutting against each other at a parting axis 26.

The smooth and low friction movement of the door panels may be facilitated by a bearing assembly disposed within the first and second housings. For example, a first slider of the first door hanger may be operably coupled with a bearing assembly disposed within the first housing, and the door panel may be operably coupled with the first slider. Additionally, a second slider of the second door hanger may be operably coupled with a bearing assembly disposed within the second housing. The bearing assemblies may include ball bearings touching a surface of the sliders, such that linear movement of the sliders and door panels causes rotational movement of the bearings.

However, the bearings of the bearing assembly may slip on the surface of the slider such that the distance travelled by the bearing assembly is less than when there is no slippage of the bearings. As one example, there may be a gap between a bearing and a surface of the slider. As another example, there may be slippage between the bearings and slider based on imperfections (e.g., out-of-dimension tolerances, shape and/or size imperfections, or the like) of one or several of the bearings, the bearing assembly, or the slider. As another example, there may be slippage based on the cage of the bearing assembly binding within the housing. The slippage of the bearing assembly may reduce an amount of linear movement of the slider eventually preventing the slider, thus the door panel, from reaching the fully open or fully closed positions.

FIG. 2 illustrates a schematic of the first door hanger shown in FIG. 1. The first door hanger includes the first housing 14A, a bearing assembly 16, a slider 56, and the door panel 40. The door panel includes a leading edge 58 and a trailing edge 60. The slider moves in the longitudinal direction 21 towards and away from a housing interference edge 54 disposed at the second end of the housing. Over time, there may be slippage of the bearing assembly as described above such that the slider may not complete its travel in one or both directions (e.g., toward the open or closed positions). For example, one end of the cage of the bearing assembly may reach the first or second ends of the housing before the slider completes its motion toward the open or closed positions due to the slippage between the bearings and the slider with repeated opening and closing cycles. In the illustrated embodiment shown in FIG. 2, a creepage 50 of the cage of the bearing assembly indicates the leading edge of the cage of the bearing assembly 16 reaching the housing interference edge 54 before the slider 56 has completed motion to the fully closed position resulting in a gap 62 between the leading edge of the door panel and the door panel being in the fully closed position. The door panel failing to close may cause the door hanger system to fail as a result of the door panels not fully closing, which may be a safety concern for passengers. In one embodiment, the door panel failing to reach the fully closed position may cause a system to fail to be locked, or the like, until the relative position of the door panel and the slider (e.g., with respect to the bearing assembly) is corrected. For example, a vehicle may be prohibited from moving until the door panel is in the fully closed position. As another example, a building security system may be unable to function until the door panel is in the fully closed position.

Therefore, a need exists to control an amount of accumulated slippage of a bearing assembly relative to a slider to ensure that the slider moves a door panel to a fully closed position with repeated cycles of operation of the door hanger. It may be desirable to have a door hanger system that differs from those that are currently available.

BRIEF DESCRIPTION

In one or more embodiments, a door hanger system may include a housing extending from a first end to a second end in a longitudinal direction, and a bearing assembly coupled with the housing. The bearing assembly may include a cage extending from a third end to a fourth end in the longitudinal direction and include plural bearings disposed within the cage. A slider may be coupled with the bearing assembly and may include a bearing interface portion disposed within the bearing assembly and a door interface portion that may be coupled with a door panel. The slider and the bearing assembly may move in a first direction toward the second end of the housing to move the door panel toward a closed position, or in a second direction toward the first end of the housing to move the door panel toward an open position. A reset device may be disposed within the bearing assembly and positioned between the first end of the housing and the slider. The reset device may extend from a fifth end to a sixth end in the longitudinal direction. The slider may interfere with the sixth end of the reset device to move the reset device in the second direction as the slider moves in the second direction. The fifth end of the reset device may interfere with the third end of the cage to move the third end of the cage toward the first end of the housing responsive to the slider moving in the second direction and the slider interfering with the sixth end of the reset device.

In one or more embodiments, a sliding door system may include a housing extending from a first end to a second end in a longitudinal direction, and a bearing assembly operably coupled with the housing. The bearing assembly may include a cage extending from a third end to a fourth end in the longitudinal direction and may include plural bearings disposed within the cage. The plural bearings may be arranged in plural rows within the cage. A slider may be coupled with the bearing assembly and include a bearing interface portion disposed within the bearing assembly. A first row of the plural rows of the plural bearings may be disposed on a first side of the bearing interface portion, and a second row of the plural rows of the plural bearings may be disposed on a second side of the bearing interface portion. A reset device may be disposed within the bearing assembly between two of the plural rows of the plural bearings. The reset device may be positioned between the third end of the cage and the slider. The reset device may extend from a fifth end to a sixth end in the longitudinal direction. The slider and the bearing assembly may move in a first direction toward the second end of the housing or in a second direction toward the first end of the housing. The slider may abut against the sixth end of the reset device to move the reset device in the second direction as the slider moves in the second direction. The fifth end of the reset device may abut against the third end of the cage to move the third end of the cage toward the first end of the housing responsive to the slider moving in the second direction and the slider abutting against the sixth end of the reset device.

In one or more embodiments, a door hanger system may include a housing, a bearing assembly coupled with the housing, a slider coupled with the bearing assembly, and a reset device disposed within the bearing assembly. The bearing assembly may include a cage and plural bearings. The plural bearings may be arranged in rows in a longitudinal direction within the cage. Movement of the slider in the longitudinal direction may translate to movement of the bearing assembly in the longitudinal direction. The reset device may be positioned to control the position of the slider with respect to the bearing assembly, and control the position of the bearing assembly with respect to the housing, while the slider moves in one of the two directions.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
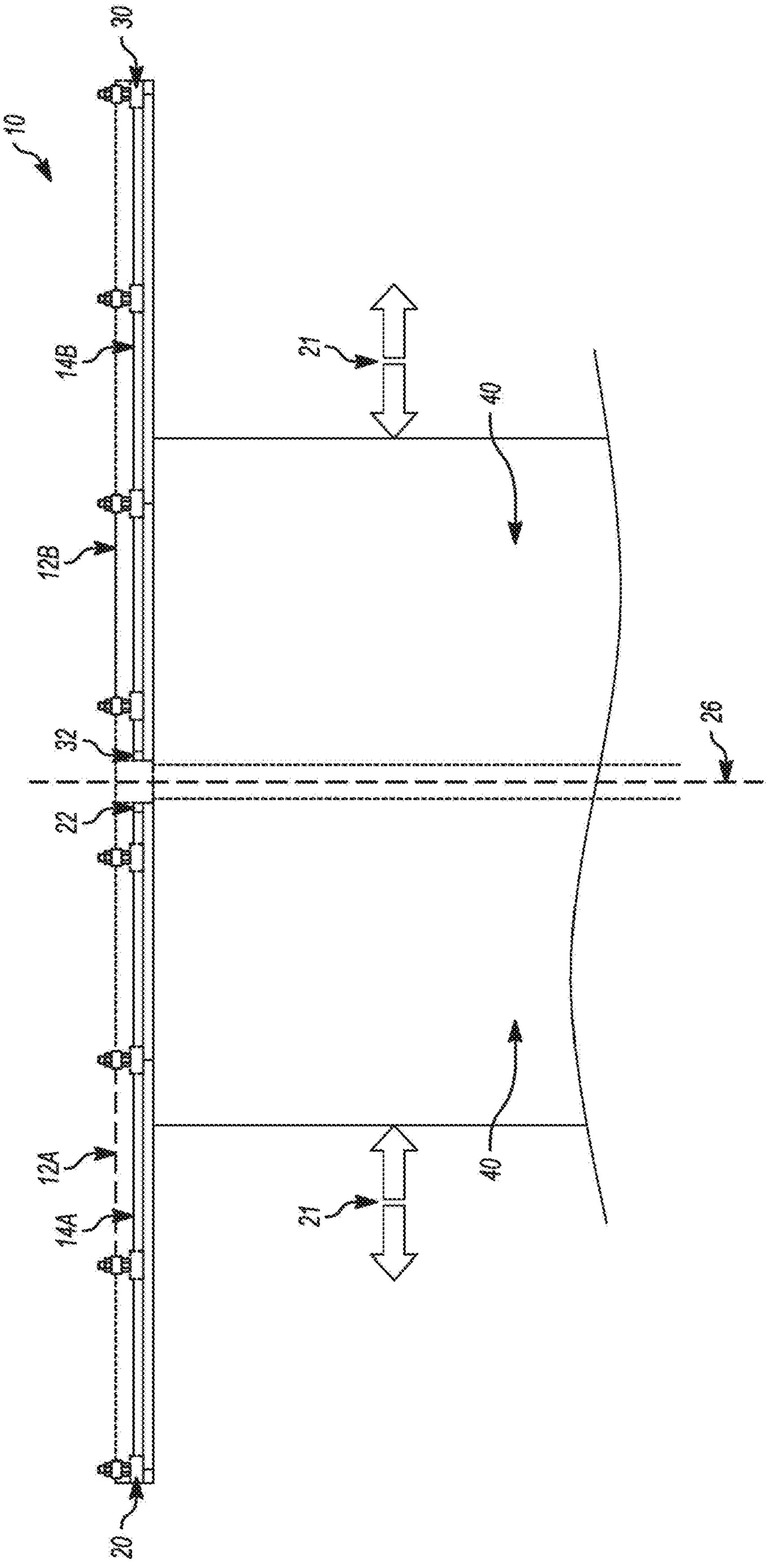
FIG. 1 PRIOR ART
FIG. 1 illustrates a front view of a bi-parting sliding door hanger system.
Figure 2:
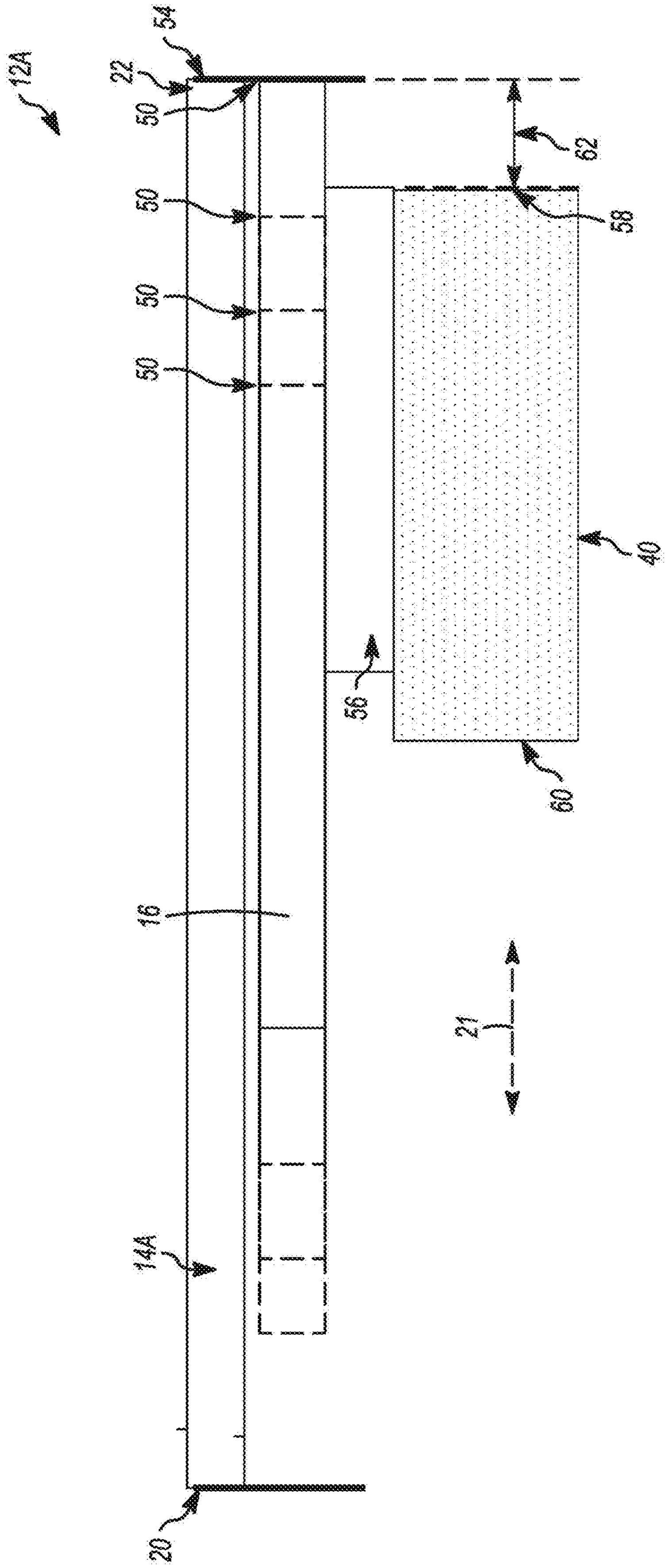
FIG. 2 PRIOR ART
FIG. 2 illustrates a schematic of the door hanger shown in FIG. 1.

Embodiments of the subject matter described herein relate to a door hanger or door hanger system and method operation. The door hanger system may be a sliding door hanger system, such that the door hanger system includes a door panel that slides in one or more directions. The door hanger system may be disposed or installed onboard a vehicle system, and may open and close to allow passengers and/or objects to board and alight from the vehicle system. In another embodiment, the door hanger system may be disposed at a platform location, such as along a route (e.g., a road, rail tracks, or the like). For example, the door hanger system may be associated with different vehicle systems such as, but not limited to, busses, passenger rail cars, non-passenger rail cars, marine vessels such as waterway taxis, ferries, or the like. The door hanger system and associated door panels may allow or prohibit people and/or objects from accessing the route.

The door hanger system may include a housing, and a bearing assembly disposed within the housing. The bearing assembly may include a cage and plural bearings disposed therein. A slider includes a bearing interface portion and a door interface portion. The bearing interface portion may be positioned or disposed within the bearing assembly, and the door interface portion may be disposed outside of the bearing assembly. The bearings of the bearing assembly may be arranged in rows along the longitudinal direction, and may be disposed or positioned within housing grooves and slider grooves of the bearing interface portion of the slider. For example, longitudinal movement of the slider may induce rotation of the bearings within the housing by contact of the bearings with the slider groove surfaces resulting in a movement of the bearing assembly relative to the housing.

The door interface portion of the slider may be coupled with a door panel. The slider may move in a longitudinal direction, such as a first direction to move the door panel toward a closed position, and in an opposite second direction to move the door panel toward one or more open positions. The door panel along with the slider may be set in motion by a door actuator (not shown or described herein).

In one or more embodiments, the door hanger assembly may include a reset device disposed within the cage of the bearing assembly between the bearing interface portion of the slider and an end of the cage. For example, the bearing interface portion of the slider may interfere with or abut against one end of the reset device responsive to the slider moving along with the door panel toward the one or more open positions, and the slider may move away from or separate from the reset device while the slider moves the door panel toward the closed position.

In one or more embodiments, the bearings of the bearing assembly may slip on a surface of the slider instead of rolling on the surface of the slider. The slippage of the bearing assembly may prevent the slider from completing the longitudinal movement toward the fully open or fully closed positions. The reset device may be positioned such that the slider may abut or interfere with one end of the reset device as the slider moves toward the fully open position to reset or correct the position of the cage of the bearing assembly relative to the position of the slider. For example, the reset device may ensure that the cage of the bearing assembly is in a correct longitudinal position relative to the slider (and corresponding door panel) and that the slider reaches the fully open and fully closed positions.

Figure 3:
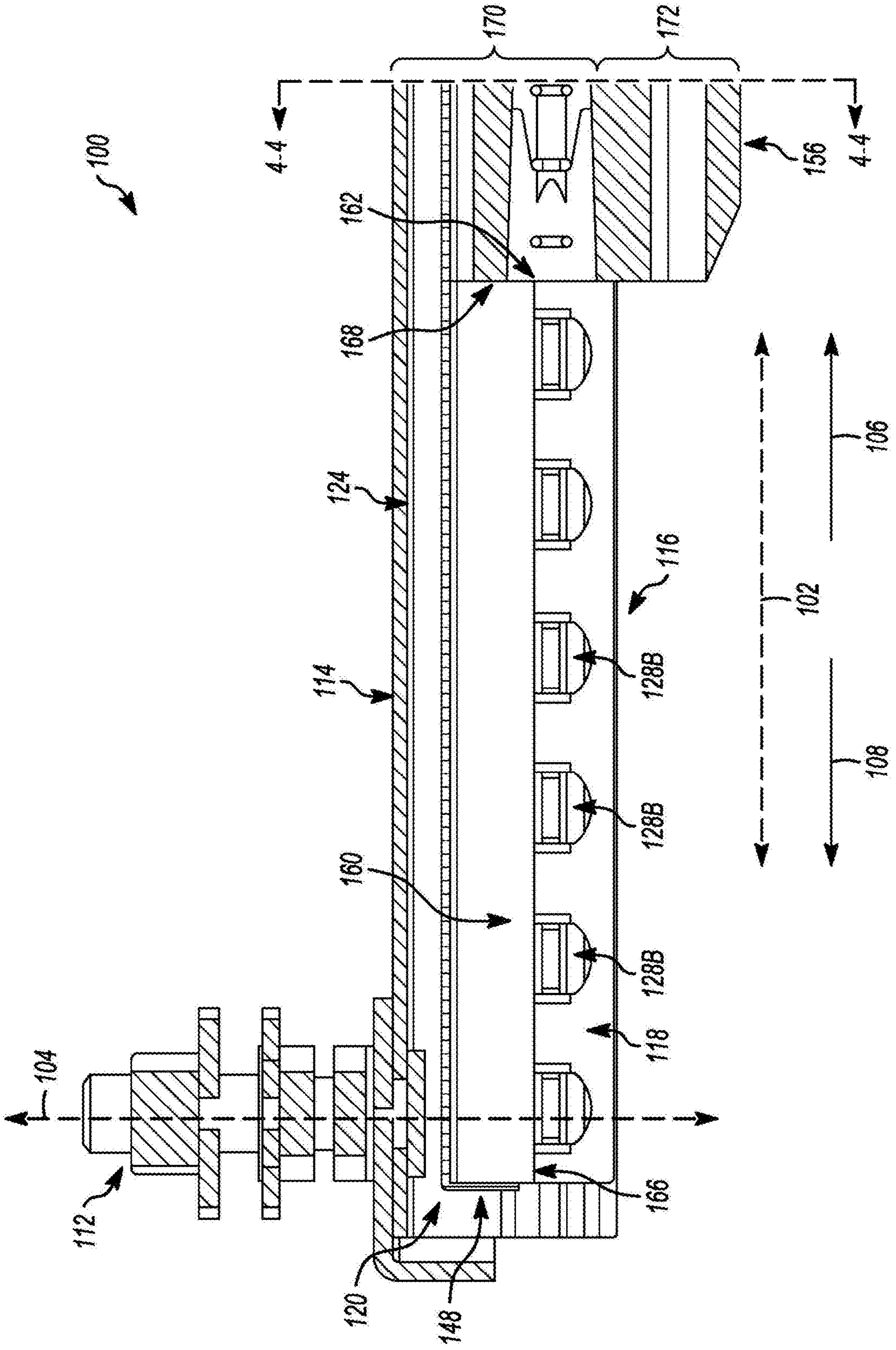
FIG. 3 illustrates a partial cross-sectional front view of a door hanger system in accordance with one embodiment.
Figure 4:
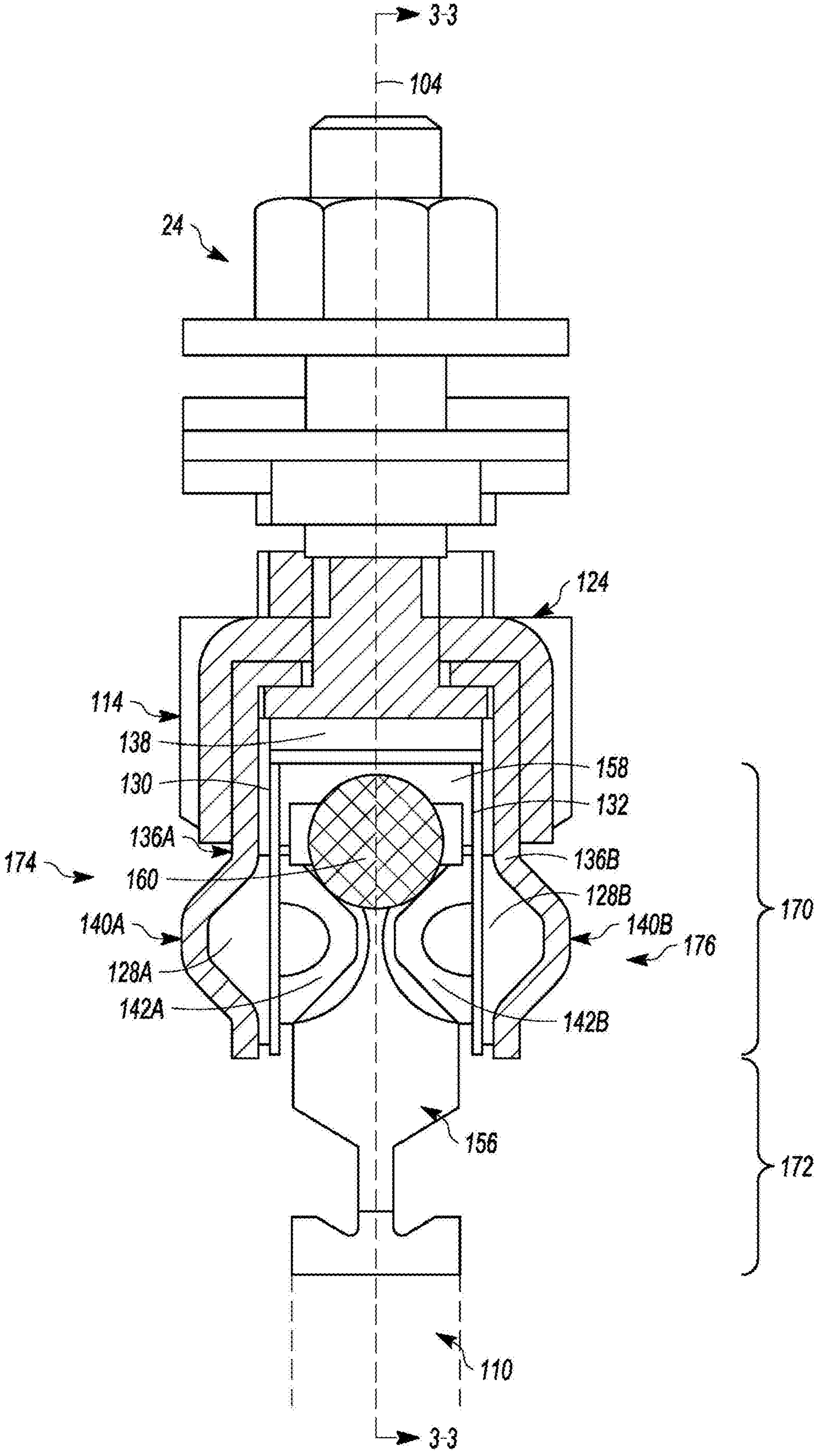
FIG. 4 illustrates a cross-sectional partial side view of the door hanger system shown in FIG. 3.
Figure 5:
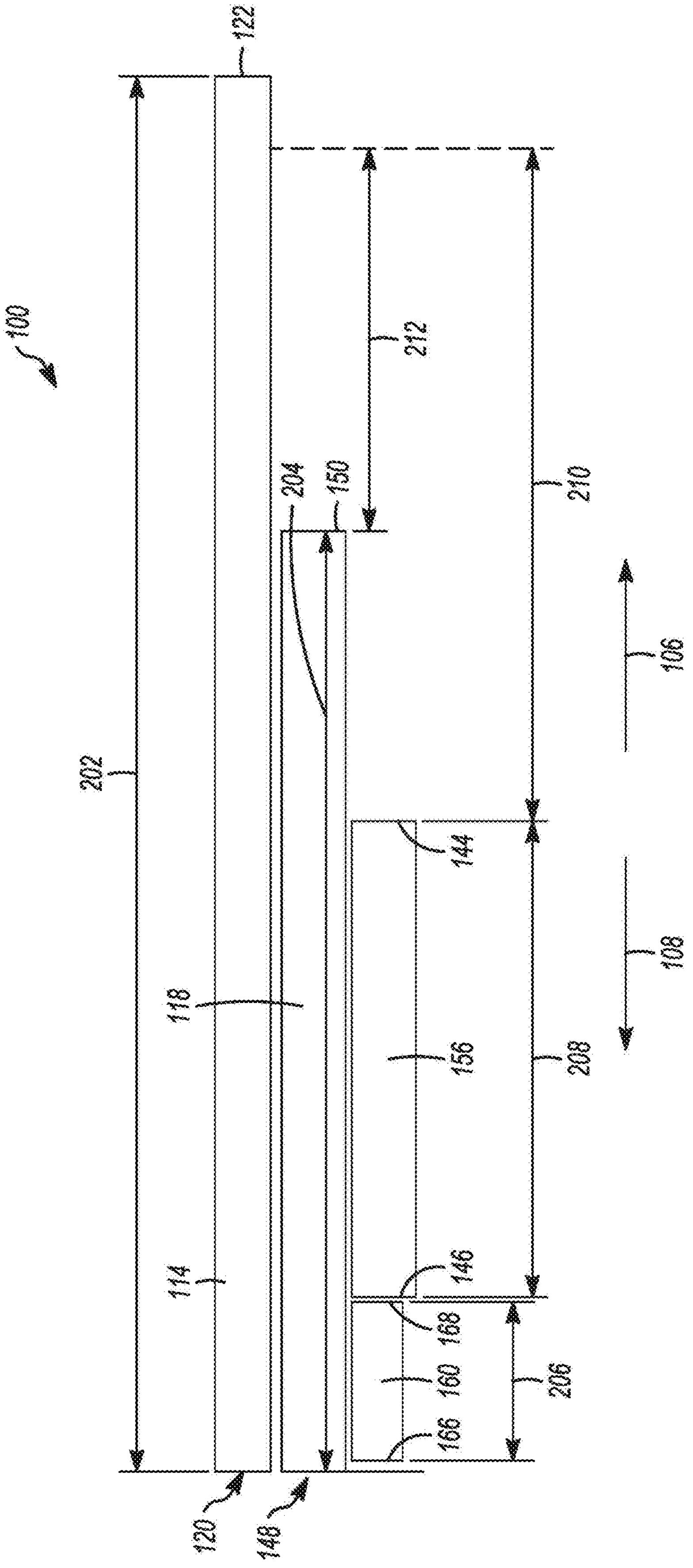
FIG. 5 illustrates a schematic of an exploded view of a door hanger system in accordance with one embodiment.

FIG. 3 illustrates a partial cross-sectional front view of a door hanger system 100 corresponding to a line 3-3 shown in FIG. 4 in accordance with one embodiment. FIG. 4 illustrates a cross-sectional partial side view of the door hanger system corresponding to a line 4-4 shown in FIG. 3. FIG. 5 illustrates a schematic of an exploded view of a door hanger system in accordance with one embodiment. FIGS. 3 through 5 will be described together herein.

The door hanger system includes a fixed housing 114 that extends along a longitudinal axis 102 between a first end 120 and an opposite second end 122. The housing includes a top surface 124, a first surface 136A, and a second surface 136B that is opposite the first side surface.

The door hanger system includes a bearing assembly 116 that is disposed within a portion of the housing. The bearing assembly includes at least a bearing cage or cage 118 and plural bearings 128*a*, 128*b* disposed therein. The cage of the bearing assembly extends between a third end 148 and a fourth end 150 in the longitudinal direction. The cage includes a top surface 138 that is disposed proximate to the top surface of the housing. The cage also includes a first side surface 130 that is disposed proximate to the first surface of the housing, and a second side surface 132 that is disposed proximate to the second surface of the housing. In one or more embodiments, the cross-sectional shape of the cage of the bearing assembly may be substantially the same or similar to the shape of the housing. For example, the cage and the housing have substantially similar cross-sectional U-shape designs with the cross-sectional size of the cage being less than or smaller than a cross-sectional size of the housing such that the shape of the housing is concentric with the shape of the cage. The cage is positioned within a cavity of the housing formed by the top surface and the first and second surfaces of the housing. Alternatively, the cage may have an alternative cross-sectional shape that is unique relative to the cross-sectional shape of the housing.

The cage of the bearing assembly includes a void, recess, cavity, or the like, defined by the top and side surfaces of the cage along with inner top surfaces of the bearings. The void or cavity may extend between the third and fourth ends of the cage in the longitudinal direction, or a distance that is shorter than the length of the cage.

The door hanger system includes a slider 156 that is coupled with the bearing assembly such that a bearing interface portion 170 of the slider extends or is disposed within a portion of the void or cavity of the cage. The slider extends between a leading end 144 and a trailing end 146 in the longitudinal direction. The slider moves in the first and second directions 106, 108, respectively, within the bearing assembly to move a door panel 110 between a closed position and one or more open positions. For example, the slider may move in the first direction toward the second end of the housing to move the door panel to the closed position, and may move in the second direction toward the first end of the housing to move the door panel to the one or more open positions. The leading end of the slider is separated from the second end of the housing while the slider is in the one or more open positions.

The slider also includes a door interface portion 172 that is coupled with the door panel. For example, the first surface 136A of the housing includes a first housing groove 140A, and the second surface 136B of the housing includes a second housing groove 140B. The first and second housing grooves are convex relative to a vertical axis 104 such that the first and second grooves extend away from the vertical axis of the door hanger system. Additionally, the bearing interface portion of the slider includes slider grooves 142, wherein a first slider groove 142A is disposed on a first side 174 of the bearing interface portion of the slider, and a second slider groove 142B is disposed on a second side 176 of the bearing interface portion of the slider. The slider grooves are concave relative to the vertical axis such that the first and second slider grooves extend into the body of the slider and toward the vertical axis. The first and second slider grooves are axially aligned with the first and second housing grooves of the housing in the vertical direction 104. For example, center locations of the first and second housing grooves in a vertical direction along the vertical axis are substantially aligned with center locations of the first and second slider grooves in the vertical direction.

When the slider is set in motion, the motion of slider is transferred by the bearing portion of the slider to the bearings causing a movement or rotation of the bearings of the bearing assembly. For example, the slider grooves and the grooves of the housing are shaped and sized to receive the bearings 128 of the bearing assembly. In the illustrated embodiment, the bearings of the bearing assembly are arranged in plural rows such that the bearings 128A of a first row are disposed on the first side of the bearing interface portion of the slider, and the bearings 128B of a second row are disposed on the second side of the bearing interface portion of the slider. For example, each of the bearings 128A of the first row of bearings are positioned horizontally within indents punched or formed into the bearing cage, and the corresponding housing grooves 140A and the corresponding slider grooves 142A on the first side of the bearing interface portion provide rolling surfaces along which the bearings may move. Each of the bearings 128B of the second row of bearings are positioned horizontally within indents punched or formed into the bearing cage, and the corresponding housing grooves 140B and the corresponding slider grooves 142B on the second side of the bearing interface portion provide rolling surfaces along which the bearing may move. Optionally, the bearing assembly may include more than two rows of bearings, wherein one or more rows of bearings may be disposed on the first side of the bearing interface portion, and one or more rows of bearings may be disposed on the second side of the bearing interface portion.

The bearings are free to rotate about an axis of rotation of each of the bearings that is substantially perpendicular to the longitudinal direction) within the cage responsive to the slider being set in motion between the first and second directions relative to the housing. Rotation of the bearings is caused by the linear movement of the slider relative to the housing based on the surfaces of the bearings interfering with (e.g., rubbing against, rotating against, or the like) the surfaces of the slider grooves and the surfaces of the housing grooves.

The door hanger system includes a reset device 160 disposed within a portion of the void or recess of the cage. For example, the reset device may be shaped and sized to fit within a portion of the void or recess of the cage. One or more surfaces of the reset device may interfere with one or more surfaces of the cage, a portion of the slider, a portion of the bearings, or the like, while the reset rod is positioned within the void space of the cage. The reset device may be a rod, a shaft, a dowel, or the like, that is positioned within the recess or void of the cage. The reset device extends between a fifth end 166 and a sixth end 168. The fifth end is disposed proximate to the third end 148 of the cage, and the sixth end of the reset device is disposed proximate to the trailing end 146 of the slider. For example, the trailing end of the slider abuts against or interferes with the sixth end of the reset device while the slider in the fully open position responsive to the slider moving in the second direction. Additionally, the third end of the cage of the bearing assembly is disposed proximate to the first end of the housing while the door panel is in the fully open position. In one or more embodiments, the system may include a gap between the third end of the cage and the first end of the housing while the door panel is in the fully open position. For example, the while the door panel is fully open, the door panel may hit or interfere with a hard stop (not shown) within the vehicle system.

Referring to FIG. 5, FIG. 5 illustrates one example of an exploded schematic arrangement of the housing 114, the cage 118, the slider 156, and the reset device 160 of one example of a door hanger system. In the illustrated embodiment of FIG. 5, the reset device is positioned below the cage, and the sizes of the reset device, the slider, and the cage have been adjusted for illustrative purposes only. The slider and the bearing assembly (not shown in FIG. 5) may move in the first direction 106 toward the second end of the housing to move the door panel toward the closed position. Additionally, the slider and bearing assembly may move in the second direction 108 toward the first end of the housing to move the door panel toward the one or more open positions. The slider moves toward the reset device while the slider moves in the second direction. For example, the trailing end 146 of the slider interferes with the sixth end 168 of the reset device to move or push the reset device in the second direction toward the first end of the housing as the slider moves in the second direction. Additionally, the fifth end of the reset device may interfere with or abut against the third end of the cage to move or push the cage of the bearing assembly toward the first end of the housing responsive to the slider moving in the second direction and the slider interfering with (e.g., pushing) the sixth end of the reset device. For example, the reset device moves in the second direction as the slider moves in the second direction, and the reset device allows movement of the cage of the bearing assembly in the second direction. For example, the reset device controls a relative position of the bearing assembly with respect to the slider in the longitudinal direction.

The door panel may be in one of plural open positions while the trailing end of the slider abuts against the sixth end of the reset device, and the fifth end of the reset device is separated from the third end of the cage and/or the first end of the housing. Optionally, the door panel may be in one of plural different open positions responsive to the leading end of the slider being separated from the second end of the housing and the trialing end of the slider being separated from the sixth end of the reset device.

In one or more embodiments, a length of the reset device 206 may be related to a length of the cage 204, a length of the slider 208, and a travel distance of the slider 210. For example, the length of the reset device may be determined by the following equation:

$$R=C-S-D/2 \quad \text{Eq. 1}$$

where "R" represents the length of the reset device 206, "C" represents the length of the cage 204, "S" represents the length of the slider 208, and "D" represents the travel distance of the slider 210. For example, the length of the reset device represents a distance between the trailing end of the slider and the third end of the cage while the door panel is in the fully open position (e.g., the third end of the cage of the bearing assembly abuts against or interferes with the first end of the housing), wherein the length of the reset device allows the leading edge of both the slider and the cage of the bearing assembly to reach a fully closed position at substantially the same time. In one or more embodiments, the slider may move or travel the distance 210 in the longitudinal direction between the fully open position and the fully closed position, and the bearing assembly may move a travel distance of the bearing 212 (e.g., a bearing distance) that is nominally half of the travel distance of the slider 210.

Figure 6:
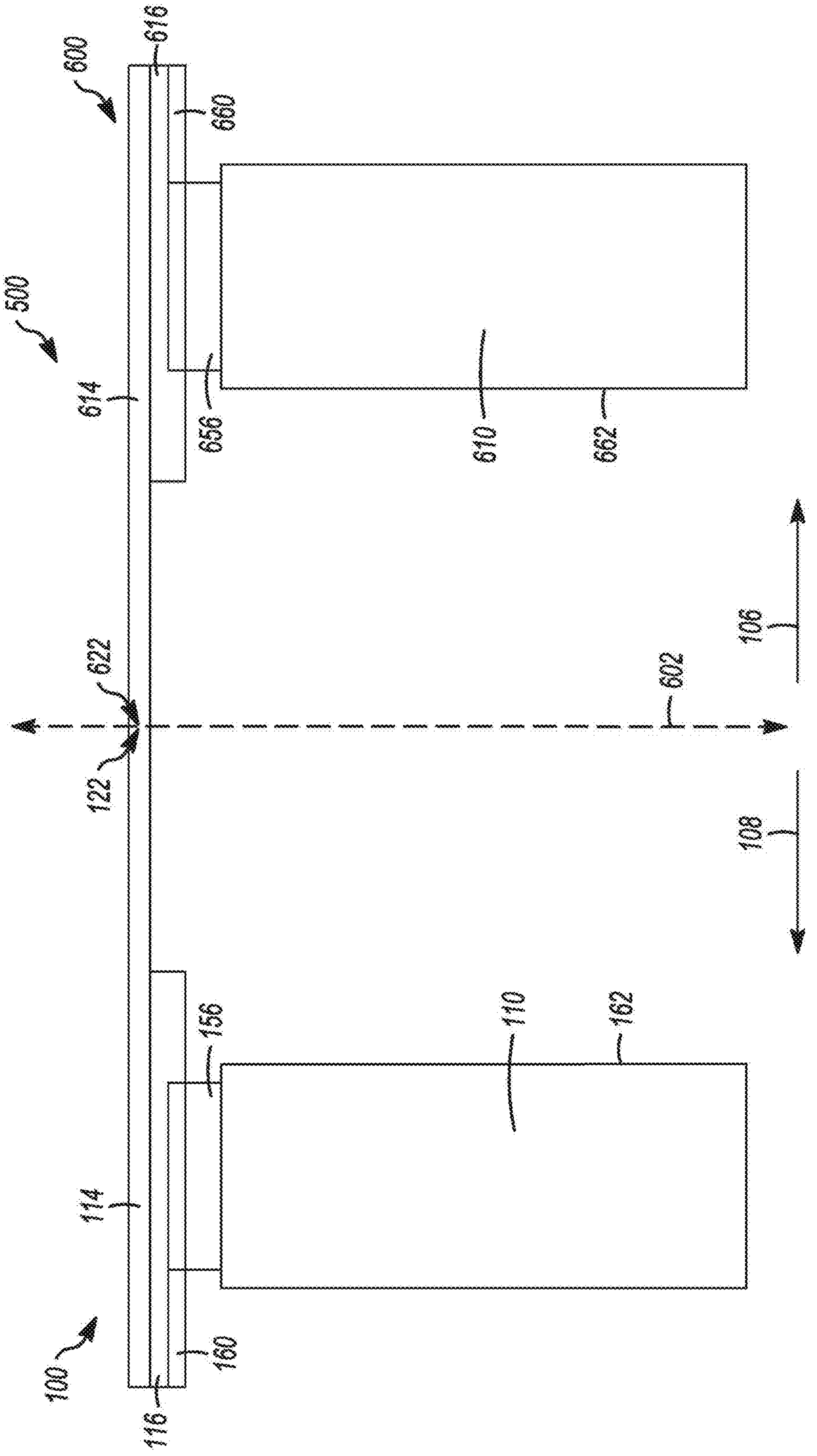
FIG. 6 illustrates a schematic of a bi-parting sliding door hanger system in accordance with one embodiment.

In one or more embodiments, the door hanger system may be a first door hanger system, and may operate together with a second door hanger system. For example, FIG. 6 illustrates one example of a bi-parting sliding door hanger system 500. The bi-parting sliding door hanger system includes the first door hanger system 100, and a second door hanger system 600. In one or more embodiments, the first and second door hanger systems may be substantially the same such that the second door hanger system is a mirrored replica of the first door hanger system about a parting axis 602 of the bi-parting sliding door hanger system. For example, like the first door hanger system, the second door hanger system may include a second housing 614, a second bearing assembly 616, a second slider 656, a second reset device 660, and a second door panel 610.

In the illustrated embodiment, the second housing includes an eighth end 622 that abuts against the second end 122 of the housing of the first door hanger system. For example, a leading edge 162 of the door panel 110 may abut against a leading edge 662 of the second door panel 610 responsive to the first and second door hanger systems being in the fully closed position. Optionally, the eighth end of the second housing of the second door hanger system may be separated from the second end of the housing of the first door hanger system such that the door panel 110 of the first door hanger system does not interfere with or abut against the second door panel 610 of the second door hanger system. For example, the second end of the housing and the eighth end of the second housing may be separated from each other by a column or alternative structural feature or component, and the leading edges of the door panels may interfere with or abut against the column while the first and door hanger systems are in the fully closed position.

The slider 156 moves in the first direction 106 toward the parting axis and toward the second door hanger system to move the door panel 110 to the closed position. Additionally, the slider 156 moves in the second direction 108 away from the parting axis and away from the second door hanger system to move the door panel 110 to one or more open positions. Alternatively, the second slider may move in the second direction 108 toward the parting axis and toward the first door hanger system to move the second door panel to the closed position. Additionally, the second slider may move in the first direction 106 away from the parting axis and away from the first door hanger system to move the second door panel to one or more open positions. In one or more embodiments, the first and second door hanger systems may operate such that the leading edges of the first and second door panels are disposed at substantially the same distances away from the parting axis. For example, the first and second sliders may operate together or in unison. Optionally, the first and second door hanger systems may operate independent of each other such that a position of the leading edge of the door panel of the first door hanger system may be independent of a position of the leading edge of the second door panel of the second door hanger system.

Figure 7:
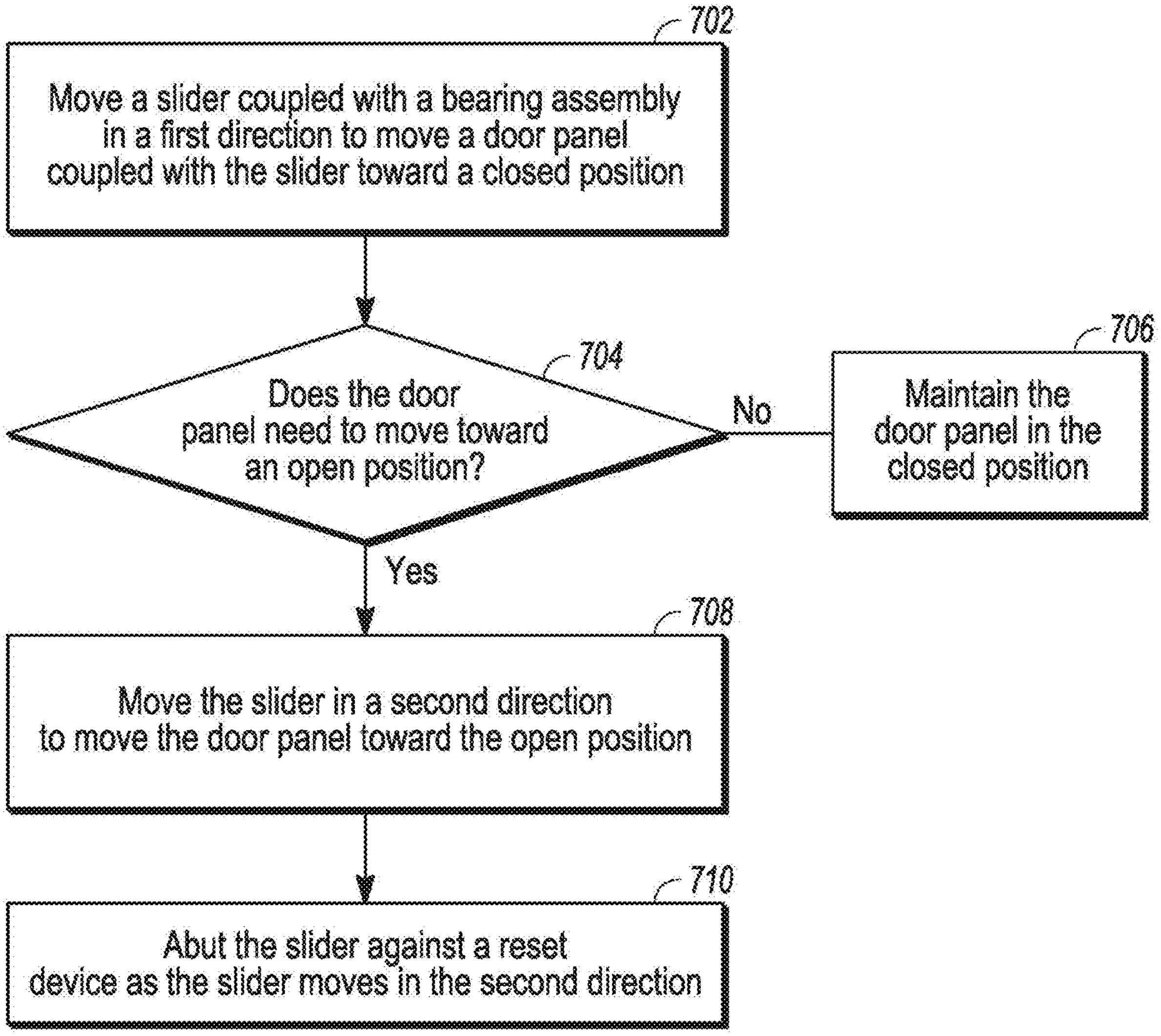
FIG. 7 illustrates a flowchart of one example of operating a door hanger system in accordance with one embodiment.

FIG. 7 illustrates a flowchart 700 of one example of operating a door hanger system in accordance with one embodiment. At step 702, a slider that is coupled with a bearing assembly of a door hanger system may be moved in a first direction to move a door panel coupled with the slider toward a closed position. The slider may be moved based on activation by an operator of the door hanger system, automatically by a control system of the door hanger system, or the like. The bearing assembly may be disposed within a housing and may include a cage. The slider may move within the cage of the bearing assembly.

At step 704, a determination is made whether the door panel needs to move toward an open position. The position of the door panel may need to be moved responsive to a vehicle system slowing or stopping movement, such as at a platform. Optionally, the door may need to be opened in an emergency to allow access into and/or out of the a vehicle system that includes the door hanger system. In one embodiment, a control system may automatically determine that the door panel needs to be moved from the closed position to an open position, or optionally an operator of the door hanger system may determine that the door panel needs to be moved to the open position. If the door panel does not need to be moved to one or more open positions, then flow of the method proceeds toward step 706 where the position of the door panel is maintained. Alternatively, if the door panel does need to be moved to an open position, flow of the method proceeds toward step 708.

At step 708, the slider is moved in a second direction that is opposite the first direction to move the door panel toward one or more open positions. As the slider moves in the second direction, at step 710, the slider abuts against or interferes with a reset device disposed within the bearing assembly. The slider interferes with or pushes the reset device in the same second direction until the other end of the reset device abuts against or interferes with an end of the cage of the bearing assembly. Additionally, the reset device may push the end of the cage of the bearing assembly in the same second direction toward an end of the housing responsive to the slider pushing or moving the reset device in the second direction.

In one or more embodiments of the subject matter described herein, a door hanger system may include a housing extending from a first end to a second end in a longitudinal direction, and a bearing assembly coupled with the housing. The bearing assembly may include a cage extending from a third end to a fourth end in the longitudinal direction and include plural bearings disposed within the cage. A slider may be coupled with the bearing assembly and may include a bearing interface portion disposed within the bearing assembly and a door interface portion that may be coupled with a door panel. The slider and the bearing assembly may move in a first direction toward the second end of the housing to move the door panel toward a closed position, or in a second direction toward the first end of the housing to move the door panel toward an open position. A reset device may be disposed within the bearing assembly and positioned between the first end of the housing and the slider. The reset device may extend from a fifth end to a sixth end in the longitudinal direction. The slider may interfere with the sixth end of the reset device to move the reset device in the second direction as the slider moves in the second direction. The fifth end of the reset device may interfere with the third end of the cage to move the third end of the cage toward the first end of the housing responsive to the slider moving in the second direction and the slider interfering with the sixth end of the reset device.

Optionally, the bearing assembly may include a void space within the cage between the plural bearings and a surface of the cage. The reset device may be shaped and positioned to be held within the void space.

Optionally, the plural bearings may be arranged in plural rows within the cage along the longitudinal direction. A first row of the plural bearings may be disposed on a first side of the bearing interface portion of the slider, and a second row of the plural bearings may be disposed on a second side of the bearing interface portion of the slider.

Optionally, the housing may include a first surface and an opposite second surface. Each of the first and second surfaces may include a groove that may receive a portion of the plural bearings of the bearing assembly. The bearings of the first row may extend within the groove of the first surface of the housing, and the bearings of the second row may extend within the groove of the second surface of the housing.

Optionally, each of the first side and the second side of the bearing interface portion of the of the slider may include a slider groove. The bearings of the first row may extend within the slider groove of the first side of the bearing interface portion, and the bearings of the second row may extend within the slider groove of the second side of the bearing interface portion.

Optionally, a length of the reset device may be related to a length of the cage of the bearing assembly between the third and fourth ends of the cage, a length of the slider, and a travel distance of the slider between the open position and the closed position.

Optionally, the third end of the cage may be disposed at the first end of the housing while the door panel is in the open position, and the fourth end of the cage may be disposed at the second end of the housing while the door panel is in the closed position.

Optionally, the slider may move a distance in the longitudinal direction. The bearing assembly may move a bearing distance that is half of the distance of the movement of the slider.

Optionally, the reset device may be positioned to abut with the slider while the slider moves in the second direction.

Optionally, the reset device may control a position of the slider within the bearing assembly and a position of the cage of the bearing assembly with respect to the housing.

Optionally, a bi-parting sliding door hanger system may include a first door hanger system and a second door hanger system A seventh end of a second housing of the second door hanger system may abut against the second end of the housing of the first door hanger system.

In one or more embodiments of the subject matter described herein, a sliding door system may include a housing extending from a first end to a second end in a longitudinal direction, and a bearing assembly operably coupled with the housing. The bearing assembly may include a cage extending from a third end to a fourth end in the longitudinal direction and may include plural bearings disposed within the cage. The plural bearings may be arranged in plural rows within the cage. A slider may be coupled with the bearing assembly and include a bearing interface portion disposed within the bearing assembly. A first row of the plural rows of the plural bearings may be disposed on a first side of the bearing interface portion, and a second row of the plural rows of the plural bearings may be disposed on a second side of the bearing interface portion. A reset device may be disposed within the bearing assembly between two of the plural rows of the plural bearings. The reset device may be positioned between the third end of the cage and the slider. The reset device may extend from a fifth end to a sixth end in the longitudinal direction. The slider and the bearing assembly may move in a first direction toward the second end of the housing or in a second direction toward the first end of the housing. The slider may abut against the sixth end of the reset device to move the reset device in the second direction as the slider moves in the second direction. The fifth end of the reset device may abut against the third end of the cage to move the third end of the cage toward the first end of the housing responsive to the slider moving in the second direction and the slider abutting against the sixth end of the reset device.

Optionally, the housing may include a first surface and an opposite second surface. Each of the first and second surfaces may include a groove. The bearings of the first row may extend within the groove of the first surface of the housing, and the bearings of the second row may extend within the groove of the second surface of the housing. The bearings of the first and second rows may rotate within the grooves of the first and second surfaces of the housing, respectively, to move the bearing assembly in the first or second direction relative to the housing.

Optionally, each of the first side and the second side of the bearing interface portion of the slider may include a slider groove. The bearings of the first row may extend within the slider groove of the first side of the bearing interface portion, and the bearings of the second row may extend within the slider groove of the second side of the bearing interface portion. The bearings of the first and second rows may rotate to move within the slider grooves of the first and second sides of the bearing interface portion of the slider responsive to movement of the slider in the first or second direction.

Optionally, a length of the reset device may be related to a length of the cage of the bearing assembly between the third end and the fourth end of the cage, a length of the slider, and a travel distance of the slider between the open position and the closed position.

Optionally, the sliding door system may include a door panel that may be coupled with a door interface feature of the slider. Movement of the slider in the first direction toward the second end of the housing may move the door panel toward a closed position, and movement of the slider in the second direction toward the first end of the housing may move the door panel toward an open position.

Optionally, the slider may abut against the sixth end of the reset device responsive to the slider moving the door panel toward the open position.

Optionally, the slider may move a distance in the longitudinal direction, and the bearing assembly may move a bearing distance that is half of the distance of the movement of the slider.

Optionally, the reset device may be retrofitted into the bearing assembly.

In one or more embodiments of the subject matter described herein, a door hanger system may include a housing, a bearing assembly coupled with the housing, a slider coupled with the bearing assembly, and a reset device disposed within the bearing assembly. The bearing assembly may include a cage and plural bearings. The plural bearings may be arranged in rows in a longitudinal direction within the cage. Movement of the slider in the longitudinal direction may translate to movement of the bearing assembly in the longitudinal direction. The reset device may be positioned to control the position of the slider with respect to the bearing assembly, and control the position of the bearing assembly with respect to the housing, while the slider moves in one of the two directions.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A door hanger system comprising:

a housing comprising a first end and a second end, wherein the housing extends from the first end to the second end along a longitudinal axis;

a bearing assembly operably coupled with the housing, the bearing assembly comprising a cage, wherein the cage further comprises a third end and a fourth end and extends from the third end to the fourth end along the longitudinal axis and including plural bearings disposed within the cage;

a slider coupled with the bearing assembly and comprising a bearing interface portion disposed within the bearing assembly and a door interface portion configured to be coupled with a door panel, wherein the slider and the bearing assembly are configured to move in a first direction toward the second end of the housing to move the door panel toward a closed position or in a second direction toward the first end of the housing to move the door panel toward an open position, wherein the plural bearings are arranged in plural rows within the cage along the longitudinal direction, wherein a first row of the plural bearings is disposed on a first side of the bearing interface portion of the slider, and a second row of the plural bearings is disposed on a second side of the bearing interface portion of the slider; and a reset device disposed within the bearing assembly and positioned between the third end of the cage and the slider, the reset device comprising a fifth end and a sixth end and the reset device extends from the fifth end to the sixth end along the longitudinal axis, the reset device extending within the cage of the bearing assembly and configured to engage with the plural bearings within the cage, wherein the slider is configured to interfere with the sixth end of the reset device at a location within the cage of the bearing assembly between the plural bearings to move the reset device in the second direction as the slider moves in the second direction, and wherein the fifth end of the reset device is configured to interfere with the third end of the cage to push the third end of the cage toward the first end of the housing responsive to the slider moving in the second direction and the slider interfering with the sixth end of the reset device, wherein the reset device is positioned between the slider and the third end of the cage such that the reset device is configured to stop movement of the slider in the second direction at a distance away from the first end of the housing and maintain contact with the plural bearings while the door panel is in the open position responsive to the third end of the cage reaching the first end of the housing.

2. The door hanger system of claim 1, wherein the bearing assembly comprises a first space that extends between the third end and the fourth end of the cage between the plural bearings and a surface of the cage, the reset device shaped and positioned to be held within the first space.

3. The door hanger system of claim 1, wherein the housing includes a first surface and an opposite second surface, each of the first and second surfaces comprising a groove configured to receive a portion of the plural bearings of the bearing assembly, wherein the first row of the plural bearings are configured to extend within the groove of the first surface of the housing, and the second row of the plural bearings are configured to extend within the groove of the second surface of the housing.

4. The door hanger system of claim 1, wherein each of the first side and the second side of the bearing interface portion of the slider comprises a slider groove, wherein the first row of the plural bearings are configured to extend within the slider groove of the first side of the bearing interface portion, and the second row of the plural bearings are configured to extend within the slider groove of the second side of the bearing interface portion.

5. The door hanger system of claim 1, wherein a length of the reset device is determined based on a length of the cage of the bearing assembly between the third end and the fourth end of the cage, a length of the slider, and a travel distance of the slider between the open position and the closed position.

6. The door hanger system of claim 1, wherein the third end of the cage is configured to be disposed at the first end of the housing while the door panel is in the open position, and the fourth end of the cage is configured to be disposed at the second end of the housing while the door panel is in the closed position.

7. The door hanger system of claim 1, wherein the slider is configured to move a distance along the longitudinal axis in the longitudinal direction, and the bearing assembly is configured to move a bearing distance that is half of the distance of the movement of the slider.

8. The door hanger system of claim 1, wherein the slider is positioned to abut with the reset device while the slider moves in the second direction.

9. The door hanger system of claim 1, wherein the reset device is configured to control an amount of linear movement of the slider to control a position of the slider within the bearing assembly and a position of the cage of the bearing assembly with respect to the housing.

10. A bi-parting sliding door hanger system comprising:

the door hanger system in accordance with claim 1, wherein the door hanger system is a first door hanger system; and a second door hanger system, wherein a door panel of the second door hanger system is configured to move toward the door panel of the first door hanger system to close the bi-parting sliding door hanger system, and the door panel of the second door hanger system is configured to move away from the door panel of the first door hanger system to open the bi-parting sliding door hanger system.

11. A sliding door system comprising:

a housing comprising a first end and a second end, wherein the housing extends from the first end to the second end along a longitudinal axis;

a bearing assembly operably coupled with the housing, the bearing assembly comprising a cage, wherein the cage further comprises a third end and a fourth end and extends from the third end to the fourth end along the longitudinal axis and including plural bearings disposed within the cage, the plural bearings being arranged in plural rows within the cage;

a slider coupled with the bearing assembly and comprising a bearing interface portion disposed within the bearing assembly, wherein a first row of the plural rows of the plural bearings is disposed on a first side of the bearing interface portion and a second row of the plural rows of the plural bearings is disposed on a second side of the bearing interface portion; and a reset device disposed within the cage of the bearing assembly configured to be operably coupled with the plural bearings, the reset device positioned between the third end of the cage and the slider, the reset device comprising a fifth end to a sixth end and the reset device extends from the fifth end to the sixth end along the longitudinal axis, wherein the slider and the bearing assembly are configured to move in a first direction toward the second end of the housing to move toward a closed position or in a second direction toward the first end of the housing to move toward an open position, wherein the slider is configured to abut against the sixth end of the reset device at a location within the cage of the bearing assembly between the plural bearings to move the reset device in the second direction as the slider moves in the second direction, and wherein the fifth end of the reset device is configured to abut against the third end of the cage to move the third end of the cage toward the first end of the housing responsive to the slider moving in the second direction and the slider abutting against the sixth end of the reset device, wherein the reset device is configured to facilitate movement of the cage and the plural bearings in the second direction toward the open position, wherein the reset device is positioned between the slider and the third end of the cage such that the reset device is configured to stop movement of the slider in the second direction at a distance away from the first end of the housing, wherein the distance is based on a length of the reset device while the door panel is in the open position responsive to the third end of the cage reaching the first end of the housing.

12. The sliding door system of claim 11, wherein the housing includes a first surface and an opposite second surface, each of the first and second surfaces comprising a groove, the first row of the plural bearings extending within the groove of the first surface of the housing, and the second row of the plural bearings extending within the groove of the second surface of the housing, wherein the first row of the plural bearings and the second row of the plural bearings are configured to rotate within the grooves of the first and second surfaces of the housing, respectively, to move the bearing assembly in the first or second direction relative to the housing.

13. The sliding door system of claim 11, wherein each of the first side and the second side of the bearing interface portion of the slider comprises a slider groove, wherein the first row of the plural bearings are configured to extend within the slider groove of the first side of the bearing interface portion, and the second row of the plural bearings are configured to extend within the slider groove of the second side of the bearing interface portion, wherein the first row of the plural bearings and the second row of the plural bearings are configured to rotate to move within the slider grooves of the first and second sides of the bearing interface portion of the slider responsive to movement of the slider in the first or second direction.

14. The sliding door system of claim 11, wherein the length of the reset device is determined based on a length of the cage of the bearing assembly between the third end and the fourth end of the cage, a length of the slider, and a travel distance of the slider between the open position and the closed position.

15. The sliding door system of claim 11, further comprising a door panel configured to be coupled with a door interface feature of the slider, wherein movement of the slider in the first direction toward the second end of the housing is configured to move the door panel toward a closed position, and movement of the slider in the second direction toward the first end of the housing is configured to move the door panel toward an open position.

16. The sliding door system of claim 15, wherein the slider is configured to abut against the sixth end of the reset device responsive to the slider moving the door panel toward the open position, wherein the slider and the door panel are configured to be spaced apart from the first end of the housing by the length of the reset device while the slider and the door panel are in the open positions.

17. The sliding door system of claim 11, wherein the slider is configured to move a distance along the longitudinal axis in a longitudinal direction, and the bearing assembly is configured to move a bearing distance that is half of the distance of the movement of the slider.

18. The sliding door system of claim 11, wherein the reset device is retrofitted into the bearing assembly.

* * * * *